United States Patent
Soardo et al.

[11] 3,849,000
[45] Nov. 19, 1974

[54] DIGITAL DISPLAY OPTICAL PYROMETER

[75] Inventors: Paolo Soardo; Mario Pasta, both of Turin, Italy

[73] Assignee: Institute Elettrotecnico Nazionale Galileo Ferraris, Turin, Italy

[22] Filed: May 17, 1973

[21] Appl. No.: 361,085

[30] Foreign Application Priority Data
May 24, 1972 Italy .................................. 68641/72

[52] U.S. Cl. ..................... 356/45, 73/355 R, 356/88
[51] Int. Cl. ............................................... G01j 5/60
[58] Field of Search ......... 356/43, 45, 88; 73/355 R

[56] References Cited
UNITED STATES PATENTS
3,654,809 4/1972 Worden et al. ...................... 356/43
3,664,744 5/1972 Liston ................................. 356/88

*Primary Examiner*—Vincent P. McGraw
*Attorney, Agent, or Firm*—Sughrue, Rothwell, Mion, Zinn & Macpeak

[57] ABSTRACT

This invention provides a digital display pyrometer which derives from the voltages $V_1$ and $V_2$ provided by photoelectric sensor means at a given temperature $T_x$ to be measured a temperature signal, by reproducing in pulse-counting and gating circuits the following relation, derived from Planck's law:

$$T_x = \frac{1}{\frac{1}{A}\ln\frac{CV_1}{V_2} + \frac{\ln\frac{1}{C} - B}{A}}$$

where A, B and C are constants. The first part of this expression is derived from the time interval taken for a capacitive storage circuit to discharge between voltage $CV_1$ and $V_2$ and the second part from a fixed time interval, both time intervals being recorded as a number of clock pulses in counters and combined in a digital display.

8 Claims, 4 Drawing Figures

DIGITAL DISPLAY OPTICAL PYROMETER

The present invention relates to a digital display optical pyrometer apparatus and is more particularly concerned with electronic signal processing circuits able to derive and to present in digital form a temperature signal from spectral radiance signals provided by photo-detectors of conventional type.

The invention may be applied both to monocromatic pyrometers and bichromatic pyrometers or colour temperature measuring instruments.

BACKGROUND OF THE INVENTION

In pyrometers of the prior art two spectral radiance signals supplied by respective photo-detectors are usually applied to an analog divider circuit, the ratio between the two signals being, according to Planck's law, related to the temperature being measured. The temperature signal is thus in analog form, and is usually presented on a suitably calibrated indicating instrument. This type of analog circuit is intrinsically imprecise due to derivatives and other causes of fluctuation.

Moreover, whenever digital presentation of the measurement is desired, recourse must be had to an analog-digital converter, which increases the cost without substantially improving the performance of the apparatus. In each case the precision of a pyrometer of this type may be increased only with progressively increased costs of production, owing to the known difficulty of stabilizing continuous quantities in analog circuits.

Thus the main object of this invention is to produce a digital display optical pyrometer apparatus which allows of obtaining for circuits of a given quality a pyrometer apparatus of higher precision than that of the prior art.

Another object of the invention is to provide pyrometer apparatus capable of deriving a digital output signal from spectral radiance signals, without the need for analog digital conversion, and with consequent further reduction in cost.

A further object of the invention consists in providing a digital display pyrometer apparatus which can readily be operated both as a bichromatic and as a monochromatic pyrometer, with simple modifications of the values of a few key components of the circuit.

SUMMARY OF THE INVENTION

The above-mentioned and other objects and advantages are attained by means of this invention, which provides a digital display optical pyrometer apparatus comprising: photometric means adapted to emit respectively a first and a second electrical signal, corresponding to respective linear functions of two radiant energy fluxes, incident on said means, circuit means connected to said photometric means to process the signals emitted thereby and to supply a digital signal proportional to the radiation temperature associated with said energy fluxes, and visual display means piloted by said digital signal and providing a digital measurement of the said temperature, wherein the improvement consists in:

(a) a charge storage circuit having a discharge time constant proportional to the reciprocal of a preselected constant $A$;

(b) a charging and comparator circuit adapted to apply to said storage circuit a voltage not less than the product of said first signal and a second preselected constant $C$, for a predetermined first time interval and to allow successively the discharge of the storage circuit to the value of the second signal;

(c) a source of electrical clock pulses; and (d) a logic circuit connected to said source of clock pulses to enable application of the output pulses of said charging and comparator circuit to the visual display means during a number of clock pulses proportional to a further time interval.

BRIEF DESCRIPTION OF THE DRAWINGS

The invention will now be described, by way of example, with reference to the accompanying drawings, wherein.

DETAILED DESCRIPTION OF THE ILLUSTRATED EMBODIMENTS

To make the understanding of this invention more immediate, the mathematical principles which form the basis of this invention will first be explained. Optical pyrometry, as is known, is based on Planck's law, expressed as:

$$L = C_1/\pi\lambda 5 \quad 1/[\exp(C_2/\lambda T) - 1]$$

wherein $C_1$ and $C_2$ are appropriate constants;
$\lambda$ is the wavelength of the radiation in question;
$L$ is the spectral black body radiance;
$T$ is the black body temperature.

Planck's law can be approximated for short wavelengths by omitting the term "$-1$" in the denominator, so that if the black body radiance of a given source of radiation for two different wavelengths $\lambda_1$, $\lambda_2$, at a temperature $T_x$ is $L_1$ and $L_2$ respectively then the temperature $T_x$ is given by:

$$T_x = \frac{C_2\left(\frac{1}{\lambda_2} - \frac{1}{\lambda_1}\right)}{\ln\frac{L_1}{L_2} + 5\ln\frac{\lambda_1}{\lambda_2}}$$

which, for two fixed wavelengths $\lambda_1$ and $\lambda_2$, may be expressed $$\ln L_1/L_2 = A/T_x + B \tag{1}$$

where $A$ and $B$ are constants which depend upon the two preselected wavelengths, or on the characteristics of optical filters employed in the pyrometer. Introducing now an arbitrary additive constant $\ln C$ in both sides of equation (1), there is obtained, after further manipulations:

$$T_x = \cfrac{1}{\cfrac{1}{A}\ln\cfrac{CL_1}{L_2} + \cfrac{\ln\frac{1}{C} - B}{A}} \qquad (2)$$

where the denominator comprises a constant term and a term which is a logarithmic function of the ratio between the two radiation fluxes.

Applying the Planck's law to an unknown source and to a reference source emitting radiation of a preselected wavelength, two relations are obtained which may be developed in a manner analogous to that referred to above finally reaching a relation analogous to equation (2):

$$T_x = \cfrac{1}{\cfrac{1}{A}\ln\cfrac{CL_1 + DL_2}{L_2} + \cfrac{\ln\frac{1}{C} - B}{A}} \qquad (2')$$

where $A$, $B$, $C$ and $D$ are new prefixed constants. Equation (2') differs formally from (2) only in the substitution of the signal $CL_1$, by a linear combination of $L_1$ and $L_2$.

In this way equation (2) is applicable also to a monochromatic pyrometer.

This invention is based upon the use of equation (2) in which $C$ is selected such that the denominator is the sum of two positive terms.

In effect the invention stems from the recognition of the fact that it is possible and relatively simply to construct a periodic waveform in which each cycle comprises a section of duration proportional to the first component in the denominator of equation (2) and a second section of duration proportional to the second component of said denominator. A digital measurement of the frequency of such a waveform can thus represent directly the temperature sought for.

Figure 1:
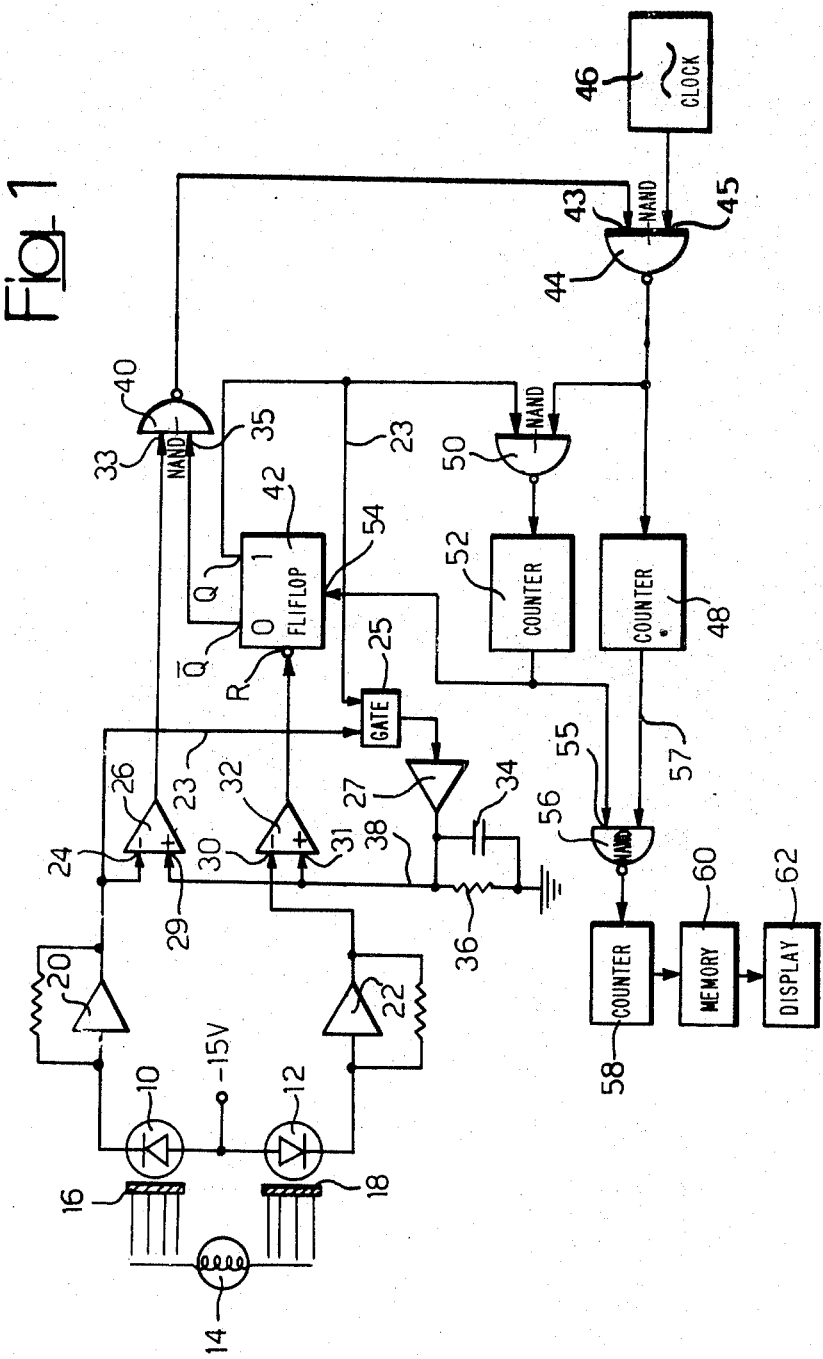
FIG. 1 is a block circuit diagram of a bichromatic optical pyrometer apparatus with digital display according to one embodiment of this invention.

Referring to FIG. 1, two photosensitive diodes 10 and 12 receive radiation from the same source 14, through respective filters 16 and 18, which transmit radiation of respective predetermined wavelengths $\lambda_1$ and $\lambda_2$. The direct current signals generated by the photosensitive diodes 10, 12 are amplified in respective amplifiers 20 and 22, which have amplification factors in the ratio C to each other. Thus the output of the amplifiers 20 and 22 will comprise two voltages $CV_1$ and $V_2$ proportional respectively to $CL_1$ and $L_2$, where $L_1$, $L_2$ are the intensities of the components of the incident radiation at wavelengths $\lambda_1$ and $\lambda_2$ respectively.

The voltage $CV_1$ is applied through an analog gate 25 enabled by a signal on a line 23 hereinafter to be to be described, to the input of an operational amplifier 27 having gain slightly greater than unity, for example, 1.2, which supplies a charge storage circuit constituted by a capacitor 34 and resistor 36. The storage circuit 34, 36 is dimensioned so as to have a discharge time constant equal to $1/A$ and a much shorter charging time constant, influenced by the low output impedance of the amplifier 27.

The output signals of the amplifiers 20 and 22 are also applied to respective inverting inputs 24 and 30 of comparators 26 and 32, the non-inverting inputs of which 29 and 31 receive a voltage $V_a$ (FIG. 2) from the storage circuit 34, 36, through a line 38.

The output signal $V_{26}$ (FIG. 2) of the comparator 26 is conducted to a first input 33 of a NAND gate 40. The output signal $V_{32}$ (FIG. 2) of the comparator 32 is applied to a reset input R of a flipflop 42 of type JK, one output Q (FIG. 2) of which is connected to the second input 35 of NAND gate 40, whilst the other output Q constitutes the enabling signal for the analog gate 25.

The output $V_{40}$ of the NAND gate 40 (FIG. 2) goes to a first input 43 of a further NAND gate 44, the second input 45 of which receives a sequence of pulses at a fixed repetition frequency from a clock 46 constituted by a quartz oscillator. The output pulses $V_{44}$ (FIG. 2) of the NAND gate 44 are passed to the input of a counter 48 and to one input of a NAND gate 50, the second input of which is piloted from the output Q of the flipflop 42. The output of the NAND gate 50 controls a counter 52 which is regulated to sub-divide the input pulses by the factor $$[\ln(1/C) - B]/A$$

The output of the counter 52 provides both a clock input 54 to the flipflop 42, and one input of a fourth NAND gate 56, the second input of which consists of the output signal from the counter 48. The output of the NAND gate 56 is applied to a counter 58 which controls a memory 60. The memory 60 is connected to a visual display device 62 of known type, for example with luminescent diodes.

Figure 2:
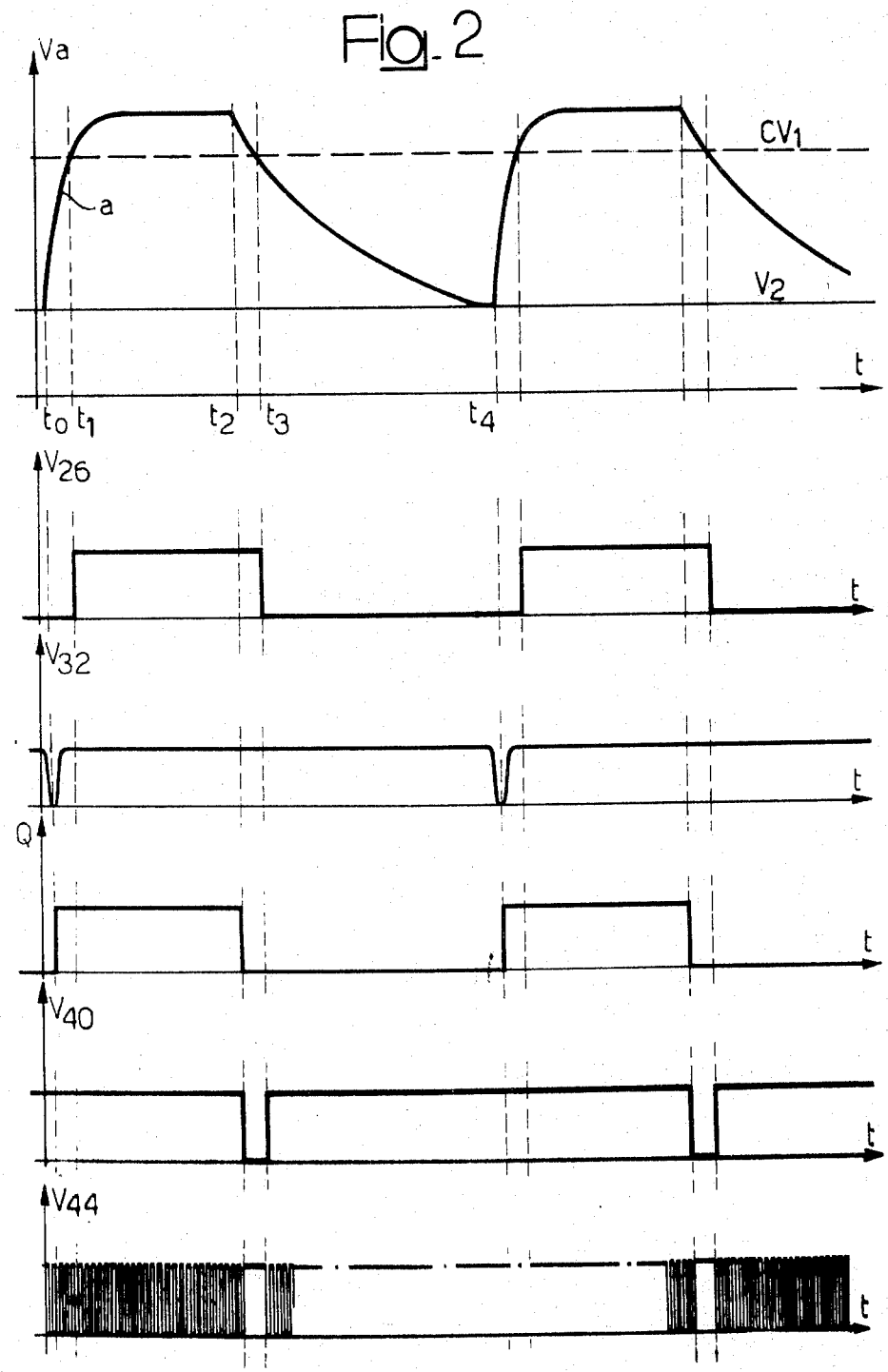
FIG. 2 illustrates diagrammatically the waveforms present at various points in the circuit of FIG. 1, useful for understanding this invention.

The operation of the circuit of FIG. 1 will now be described with reference to the waveforms of FIG. 2.

Assuming that the flipflop 42 is initially primed, at time $t_o$, the signal $CV_1$ at the output of the amplifier 20 is applied to the amplifier 27 which multiplies it by the factor 1.2 and applies it to the storage circuit 34, 36. The voltage across the capacitor 34 rises rapidly, due to the low charging time constant and the low output impedance of the amplifier 27, as seen by the section of curve $a$ of FIG. 2. During this phase the output $V_{26}$ of the comparator 26 is low, since the signal applied directly to its inverting input 24 is higher than the signal applied to its non-inverting input. Consequently the NAND gate 40 is blocked. Since the NAND gate 40 is connected to the input 43 of the NAND gate 44, the latter passes clock pulses from the clock 46, which pulses have negative polarity, at the input of the NAND gate 50 as signal $V_{44}$. Therefore the counter 52 starts to count the clock pulses $V_{44}$ (FIG. 2).

Also the NAND gate 56, having a 1 on its input 57, allows the passage of the clock pulses from the counter 52 applying them to the counter 58. The counter 48 is regulated to divide the input pulses by a prefixed factor such, that it emits an output pulse at preselected time intervals. If, for example, said time intervals are made equal to one second, the relation $$n\,\Delta t_1 + n\,\Delta t_2 = 1 \text{ sec is satisfied} \qquad (3)$$

wherein $n$ is the number of pulses per second corresponding to one measure, $\Delta t_1$ is the duration of each discharge and $\Delta t_2$ is the interval of time between two successive discharges.

At the instant $t_1$ the output of the comparator 26 becomes high, but the output of the NAND gate 40 remains high because the output Q of the flipflop 42 is high. Nothing is changed in the condition of the rest of the circuit.

When the counter 52 has counted the prescribed number of pulses it emits an output pulse which causes the condition of the flipflop 42 to change (at time $t_2$). Therefore the output Q of the flipflop 42 becomes low, the output $V_{40}$ of the NAND gate 40 becomes low, and the clock pulses from the clock 46 are inhibited in the gate 44. No more pulses are counted in the counter 48, until the instant ($t_3$) at which the signal across the capacitor 34 has decayed sufficiently to render the output of the comparator 26 low again. The output of the NAND gate 40 then becomes high again, enabling the NAND gate 44 again, and thus allowing the counter 48 to resume counting the clock pulses.

When, at the instant $t_4$, the voltage across the capacitor 34 has fallen to a value corresponding to the signal supplied by the amplifier 22, the output of the comparator 32 becomes low, with consequent priming of the flipflop 42. This immediately causes resumption of charging of the storage circuit, 34, 36 with consequent commutation of the comparator 32. The above-described cycle then resumes.

In the interval between the instants $t_2$ and $t_3$ the NAND gate 44 is disabled and consequently the clock pulses from the clock 46 are not counted during this interval. Thus everything follows as if the interval between $t_2$ and $t_3$ did not exist from the point of view of the measuring system. Such extraneous interval serves only to allow the development of the spurious transitory phenomena at the start of the discharge, without any prejudicial effect on the precision of measurement. Therefore the counter 58 finally counts the output pulses of the counter 52, during the time intervals between two consecutive output pulses of the counter 48, that is, during intervals of one second.

With reference to equation (2), since the duration of the interval between $t_0$ and $t_2$ is proportional, by construction, to $$[ln (1/C) - B]/A$$

and since the time interval between $t_3$ and $t_4$ is proportional, given an exponential discharge of the capacitor 34, to:

$$(1/A) ln (CV_1/V_2)$$

it follows that the count in the counter 58 is exactly prooprtional to the reciprocal of the sum of these two expressions, and is therefore a measure of the desired temperature, according to equation (2).

This result is obtained directly without the need at any point in the circuit to take an effective analog measurement of the levels of the signals supplied by the photodiodes 10, 12. The accuracy of the measurement is in effect dependent on the accuracy of time or of frequency determinations which it is possible to effect with high precision and at relatively low cost.

Applying Planck's law to an unknown source and to a reference source, usually a tungsten strip at a known temperature, for a predetermined narrow band of wavelengths, it is possible to derive a measurement of the radiation temperature of the unknown source by applying to the two signals representative of the intensity of radiation from the two sources mathematical operations analogous to those discussed with reference to the bichromatic pyrometric measurements. The circuit described may be readily adapted also, to this second, monochromatic, case, by simple modification of the characteristic constants.

Figure 3:
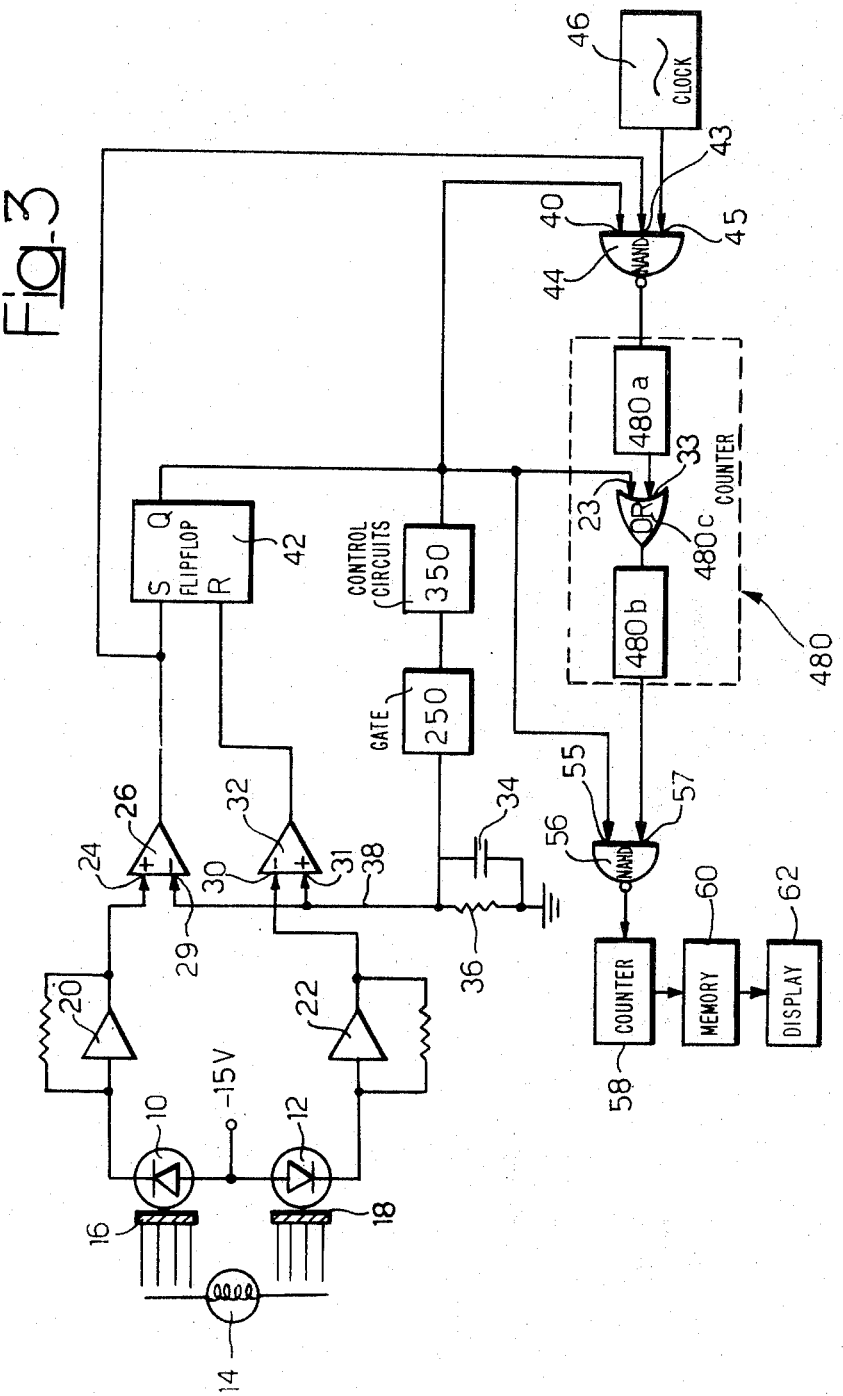
FIG. 3 is a block schematic circuit diagram of a variant of the circuit of FIG. 1.

In the circuit illustrated in the variant of FIG. 3, the input circuit which transfers the direct current signals from the respective photodiodes 10, 12 to the respective inputs of the operational amplifiers 26 and 32 is identical with the previously described input circuit of FIG. 1. Thus the said signals are passed through respective amplifiers 20 and 22 to the respective non-inverting and inverting inputs inputs 24 and 30 respectively of comparators 26 and 32, the respective inverting and non-inverting inputs 29 and 31 of which are at a potential equal to the voltage $V_A$ (FIG. 4) across the terminals of the storage circuit 34, 36 by virtue of a line 38 connected to the latter inputs.

The output signal $V_{26}$ (FIG. 4) of the comparator 26 is sent simultaneously to a first input 43 of a NAND gate 44 and to one input S of a flipflop 42 of type RS; the second input R of the flipflop 42 receives the output signal $V_{32}$ of the comparator 32. The output Q of the flipflop 42 supplies a signal to an analog gate 250 through a control circuit 350 which controls the charging of a charge storage circuit constituted by a capacitor 34 and resistor 36.

The storage circuit 34, 36 is dimensioned to have a discharge time constant equal to 1/A as in the example previously described.

The charging time constant is in this case very much shorter, being influenced by the low output impedance of the analog gate 250. The signal provided at the output Q of the flipflop 42 is also sent to a second input 40, of the NAND gate 44, which in addition has a third input 45 to which a sequence of clock pulses $V_c$ is applied from a clock 46 constituted by a quartz oscillator.

The output pulses $V_{44}$ (FIG. 4) of the NAND gate 44 are sent to the input of a counter 480 divided into two sections 480a, 480b arranged in cascade with an intermediate OR circuit 480c having two inputs 33 and 23. The OR circuit input 33 is connected to the output of the counter section 480a while the OR circuit input 23 receives the signals from the output Q of the flipflop 42. The output signal of the OR circuit 480c is passed to the second section 480b of the counter 480.

The counter 480 advances at each pulse emitted by flipflop 42 by a quantity proportional to the factor $$[ln (1/C) - B]/A$$

The output of the counter 480 pilots one input 57 of a third NAND gate 56, the second input 55 of which receives pulses emitted by the output Q of the flipflop 42. The output signal of the NAND gate 56 is applied, as in the embodiment of FIG. 1, to a counter 58 which controls a memory 60. The memory 60 in turn controls a visual display device 62 of known type, including for example luminescent diodes.

The embodiment illustrated in FIG. 3 differs from that shown in FIG. 1 mainly in the method by which the counting is effected relative to the number of discharges corresponding to one measurement.

As previously stated, in the circuit of FIG. 1 the counter 48 and the counter 52 are regulated, for instance in such manner that an output pulse is emitted every second, thus satisfying the previously stated equation (3).

In the embodiment of FIG. 3 the counting takes place in the counter 480, in which the section 480a divides by a factor $N_1$, and the section of 480b divides by the factor $N_2$, while the OR circuit 480c causes the counter 480 to advance by a quantity proportional to $\Delta t_2$. The factors $N_1$ and $N_2$ are chosen so as to satisfy the relation:

$$N_1 \cdot N_2 = F \qquad (4)$$

where $F$ is the frequency of the clock pulses emitted by the clock 46. Thus the new system of counting is effected according to the following relation:

$$n N_1 + n \Delta t_1 F = F$$

from which, dividing $F$ there is obtained:

$$n (N_1/F) + n \Delta t_1 = 1$$

Comparing with the relation (3) it is noted that:

$$n (N_1/F) = n \Delta t_2; \quad N_1 = F \cdot \Delta t_2$$

Thus the computation is effected in such manner that the pulses obtained at the output Q of the flipflop 42 cause the count to advance in each cycle by a quantity corresponding to the factor $$[1n (1/C) - B]/A$$

which appears in the fundamental equation (2).

The operation of the circuit shown in FIG. 3 will now be described, with reference to the waveforms depicted in FIG. 4. No description will, however, be given of the operation of the input circuit, which is identical with that of the input circuit of FIG. 1.

Figure 4:
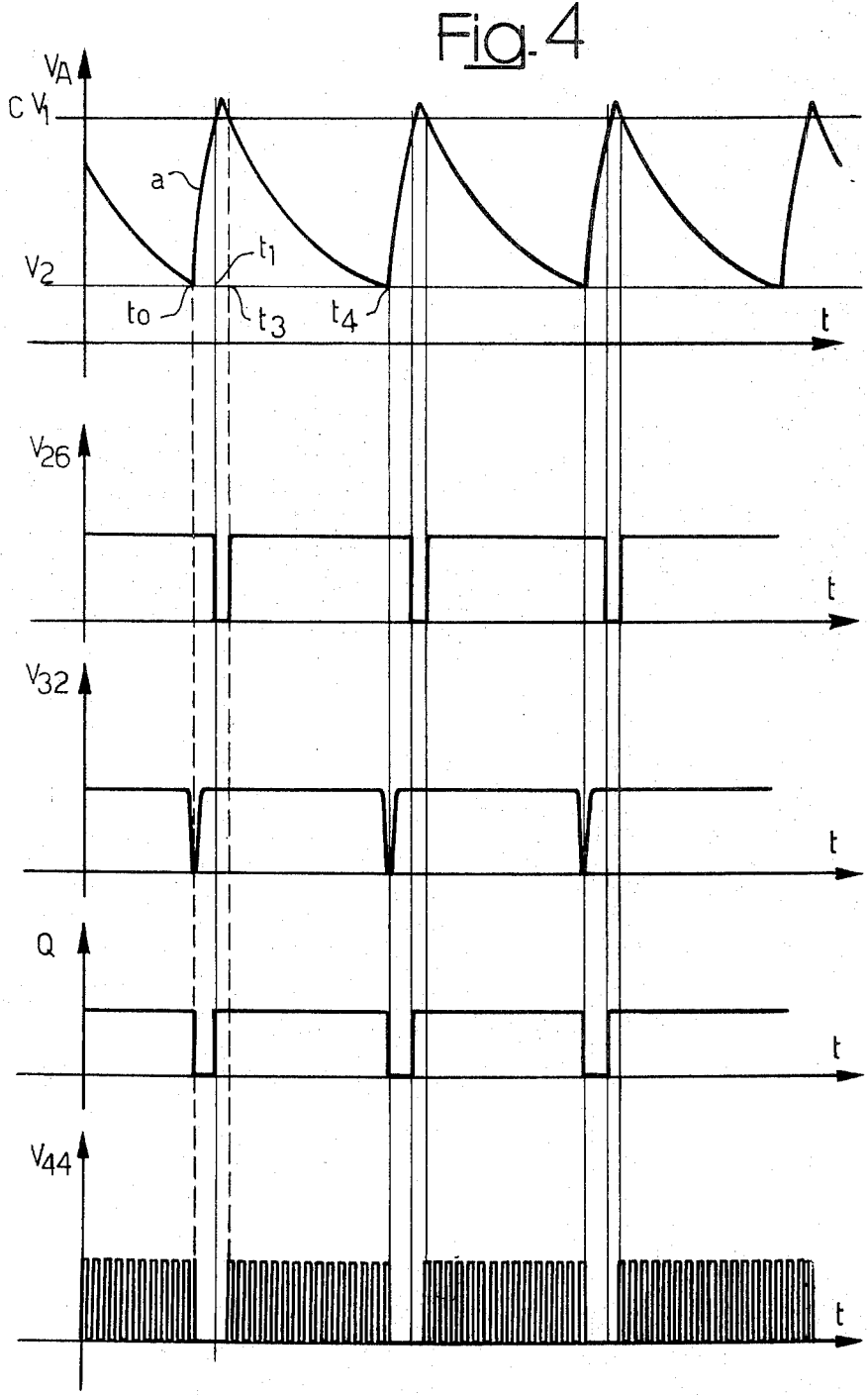
FIG. 4 illustrates diagrammatically waveforms present at various points in the circuit of FIG. 3.

Commencing at time $t_0$, the voltage $V_A$ across the capacitor 34 rises rapidly, the latter having a small charging time constant due to the low output impedance of the analog gate 250, as illustrated by the curve section $a$ in the plot of $V_A$ in FIG. 4. During this phase the output $V_{26}$ of the comparator 26 is high because the signal applied directly to its non-inverting input 24 is higher than the signal applied to its inverting input 29. At the instant $t_1$, when the voltage $V_A$ across the capacitor 34 becomes equal to the voltage $CV_1$ applied to the non-inverting input 24, the voltage $V_{26}$ is brought to zero level.

In the same time interval between $t_0$ and $t_1$, the voltage at the output Q of the flipflop 42 is zero. At the instant $t_1$, since the voltage $V_{26}$ applied to the flipflop input S then goes to zero level, the flipflop 42 changes its state and the voltage at output Q passes to a high level (1).

In the interval $t_1 - t_3$, with the signal $V_A$ remaining above the level $CV_1$, the voltage $V_{26}$ remains at zero level.

Therefore during the interval $t_0 - t_3$ the NAND gate 44 remains blocked and the output pulses of the clock 46 are inhibited; thus no pulses from the NAND gate 44 are counted in the counter 480; the counter 480 during this interval will advance by a quantity equal to $N_1$.

When the voltage $V_A$ across the capacitor 34 falls below the level $CV_1$, the voltage $V_{26}$ at the output of the comparator 26 is at a high level, and the output Q of the flipflop 42 remains at the high level one, thus at each input 40 and 43 of the NAND gate 44 there will be a voltage at a high level (1). The NAND gate 44 thus becomes unblocked and allows passage of the pulses of the clock 46 applied to the section 480a of the counter 480. During the whole of the interval $t_3 - t_4$ the counter 480 will count the pulses passed through the NAND gate 44.

The NAND gate 56 during the interval relative to one measurement, having a voltage at the high level (1) at its input 57, allows the pulses from the output Q of the flipflop 42 to pass, applying them to the input of the counter 58.

When, at the instant $t_4$, the voltage across the capacitor 34 has attained the value $V_2$ corresponding to the signal furnished by the amplifier 22, the output of the comparator 32 becomes low, with the consequent commutation of the flipflop 42. This immediately causes, by means of the analog gate 250 and of the relative control circuit 350, the resumption of charging of the storage circuit 34, 36, with consequent commutation of the comparator 32.

The cycle then repeats itself as hereinbefore described.

We claim:

1. Digital display optical pyrometer apparatus comprising photometric means adapted to emit respectively a first and a second electrical signal, corresponding to respective linear functions of two radiant energy fluxes incident on said means, circuit means connected to said photometric means to process the signals emitted thereby and to supply a digital signal proportional to the radiation temperature associated with said energy fluxes and visual display means piloted by said digital signal and providing a digital measurement of the said temperature, wherein the improvement consists in:
   a. a storage circuit having a discharge time constant proportional to the reciprocal of a preselected constant A;
   b. a charging and comparator circuit adapted to apply to said storage circuit a voltage not less than the product of said first signal and a second preselected constant C, for a predetermined first time interval, and to allow successively the discharge of the storage circuit to the value of the second signal so as to cause a sequence of charge and discharge cycles of said storage circuit to take place;
   c. a source of electrical clock pulses; and
   d. a logic circuit including first counter means arranged to count a number of pulses emitted by the source of clock pulses, said number being proportional to the expression $[1n(1/C) - B]/A$ wherein $B$ is a third preselected constant and to emit at the termination of said counting an output pulse which initiates the functioning of said charging and comparator circuit to allow discharge of the storage circuit, said logic circuit further including second counter means which enables the application to said visual display means of the pulses counted by said first counter means during a preselected time interval.

2. The apparatus defined in claim 1, wherein said charging and comparator circuit includes a first comparator which records the instant in which the signal in the storage circuit becomes equal to the second signal to control resumption of charging of the storage circuit and the start of counting by said counter means.

3. The apparatus defined in claim 2, wherein the charging and comparator circuit includes a further comparator which records the instant in which the signal in the storage circuit becomes equal to the product of the first signal and the constant C, and thereupon supplies to the logic circuit a signal marking the instant of starting of the time during which the signal in the storage circuit is comprised between the value of said first and of said second signal.

4. The apparatus defined in claim 1, wherein the storage circuit is a resistance-capacitance circuit.

5. The apparatus defined in claim 1, wherein the constant A is proportional to the difference between the reciprocals of the wavelengths of the respective signals to which the photometric means are responsive.

6. The apparatus defined in claim 1, wherein the constant B is proportional to five times the natural logarithm of the ratio of two wavelengths to which the photometric means are responsive.

7. Digital display optical pyrometer apparatus comprising photometric means adapted to emit respectively a first and a second electrical signal corresponding to respective linear functions of two radiant energy fluxes incident on said photometric means, circuit means, connected to said photometric means to process the signals emitted thereby and to supply a digital signal proportional to the radiation temperature associated with said energy fluxes, and visual display means piloted by said digital signal and providing a digital measurement of the said temperature, wherein the improvement consists in:
   a. a storage circuit having a discharge time constant proportional to the reciprocal of a preselected constant A;
   b. a charging and comparator circuit adapted to apply to said storage circuit a voltage not less than the product of said first signal and a second preselected constant C, and to allow successively the discharge of the storage circuit to the value of the second signal, so as to cause a sequence of charge and discharge signals of said storage circuit to take place;
   c. a source of electrical clock pulses; and
   d. a logic circuit controlled by said source of clock pulses to enable application of the output pulses of said charging and comparator circuit to the visual display means during a number of clock pulses proportional to a preselected time reduced by a time $n\Delta t$, where $n$ is the number of discharges corresponding to one measurement and $\Delta t$ is an interval of time proportional to the factor $[ln(1/C) - B]/A$ wherein $B$ is a third preselected constant.

8. The apparatus defined in claim 7, wherein the logic circuit comprises counter means effective in each charge and discharge cycle of the storage circuit to advance the counted quantity by an amount corresponding to said factor, $[ln(1/C) - B]/A$.

* * * * *